United States Patent
Childress et al.

(10) Patent No.: US 10,614,226 B2
(45) Date of Patent: *Apr. 7, 2020

(54) MACHINE LEARNING STATISTICAL METHODS ESTIMATING SOFTWARE SYSTEM'S SECURITY ANALYSIS ASSESSMENT OR AUDIT EFFORT, COST AND PROCESSING DECISIONS

(71) Applicant: International Business Machines Corporation, Armonk, NY (US)

(72) Inventors: Rhonda L. Childress, Austin, TX (US); Sharon Hagi, Thornhill (CA); Jeffrey C. Turnham, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/117,973

(22) Filed: Aug. 30, 2018

(65) Prior Publication Data

US 2018/0373880 A1 Dec. 27, 2018

Related U.S. Application Data

(63) Continuation of application No. 14/863,641, filed on Sep. 24, 2015, now Pat. No. 10,095,869.

(51) Int. Cl.
*G06F 21/57* (2013.01)
*G06N 20/00* (2019.01)
*G06N 3/08* (2006.01)

(52) U.S. Cl.
CPC ............ *G06F 21/577* (2013.01); *G06N 3/08* (2013.01); *G06N 20/00* (2019.01); *G06F 2221/033* (2013.01)

(58) Field of Classification Search
CPC ............ G06F 21/577; G06F 2221/033; G06N 99/005
See application file for complete search history.

(56) References Cited

U.S. PATENT DOCUMENTS

| | | |
|---|---|---|
| 5,485,409 A | 1/1996 | Gupta et al. |
| 6,077,313 A | 6/2000 | Ruf |
| 6,324,656 B1 | 11/2001 | Gleichauf et al. |
| 6,968,377 B1 | 11/2005 | Gleichauf et al. |
| 7,096,502 B1 | 8/2006 | Fox et al. |
| 7,284,274 B1 | 10/2007 | Walls et al. |

(Continued)

OTHER PUBLICATIONS

Gary D. Boetticher, Using Machine Learning to Predict Project Effort: Empirical Case Studies in Data-Starved Domains, 2001 http://sce.uhcl.edu/boetticher/mbre01_paper.pdf.

(Continued)

*Primary Examiner* — Lynn D Feild
*Assistant Examiner* — Abdullah Almamun
(74) *Attorney, Agent, or Firm* — Terrile, Cannatti & Chambers, LLP; Stephen A. Terrile

(57) ABSTRACT

A method, system and computer-usable medium for generating a security analysis effort, cost and process scope estimates, comprising: analyzing a software system; identifying a complexity level of a security analysis, the complexity level of the security analysis comprising identification of an effort level for the security analysis; and, generating the security analysis effort estimate, the security analysis effort estimate comprising an estimate of an effort expenditure to perform a security analysis on the software system at the identified complexity level.

20 Claims, 3 Drawing Sheets

(56) References Cited

U.S. PATENT DOCUMENTS

| | | |
|---|---|---|
| 8,272,061 B1 | 9/2012 | Lotem et al. |
| 8,418,251 B1 | 4/2013 | Satish |
| 9,009,837 B2 | 4/2015 | Nunez Di Croce |
| 9,032,533 B2 | 5/2015 | Bennett et al. |
| 9,076,114 B2 | 7/2015 | Alonzo et al. |
| 9,274,924 B2 | 3/2016 | Hentschel et al. |
| 9,311,218 B2 | 4/2016 | Korner et al. |
| 2004/0003382 A1 | 1/2004 | Steensgaard |
| 2004/0128543 A1 | 7/2004 | Blake et al. |
| 2005/0193430 A1 | 9/2005 | Cohen |
| 2008/0209567 A1 | 8/2008 | Lockhart et al. |
| 2009/0249489 A1 | 10/2009 | Livshits et al. |
| 2010/0023928 A1 | 1/2010 | Hentschel et al. |
| 2013/0227516 A1 | 8/2013 | Kriegsman |
| 2013/0318600 A1 | 11/2013 | Serrano et al. |
| 2015/0227745 A1 | 8/2015 | Bhattacharya |
| 2015/0302198 A1 | 10/2015 | Payne et al. |

OTHER PUBLICATIONS

Michael A. Kelly, A Methodology for Software Cost Estimation Using Machine Learning Techniques, Thesis, Sep. 1993, http://www.dtic.mil/dtic/tr/fulltext/u2/a273158.pdf.
List of IBM Patents or Applications Treated as Related.

MACHINE LEARNING STATISTICAL METHODS ESTIMATING SOFTWARE SYSTEM'S SECURITY ANALYSIS ASSESSMENT OR AUDIT EFFORT, COST AND PROCESSING DECISIONS

BACKGROUND OF THE INVENTION

Field of the Invention

The present invention relates in general to the field of computers and similar technologies, and in particular to security qualities of software utilized in this field. Still more particularly, it relates to a method, system and computer-usable medium for determining the difficulty level, effort degrees, cost sizing and process decisions involved in analyzing, assessing or auditing the security of the software system.

Description of the Related Art

Organizations today are exposed to a greater volume and variety of attacks than in the past. Advanced attackers are clever and patient, leaving just a whisper of their presence. Accordingly, it is desirable to provide security functionality which helps to detect and defend against threats by applying sophisticated analytics to more types of data. It is also desirable to provide such security functionality which identifies high-priority incidents that might otherwise get lost in the noise of the overall operation of a large scale information processing environment. Insecure software systems, exhibiting vulnerabilities afflicted due to insecure design, coding, testing and deployment development processes are principally responsible for the greater risk organizations face due to increasing levels of attacks. The magnitude, scope, effort and cost involved in analyzing software systems for security issues is difficult for humans to accurately estimate. The challenge is further amplified when such assessments are required to exhibit accurate and optimal repeatability and predictability. Software system attributes, complexity and interdependencies are far too complex for humans, even with great experience, to comprehend to a degree that would allow such estimations to be effective. The use of statistical analysis based on decomposition of software system features, complexity categorization, code structure and static and run-time dependencies is aided with the use of machine learning algorithms to produce continually refined machine generated estimates for security system software analysis, assessment or audit effort, cost and other useful decision parameters.

It is known to provide security functionality to IT environments via security intelligence platforms which integrate security information and event management (SIEM), log management, anomaly detection, vulnerability management, risk management and incident forensics into a unified solution. One aspect of providing a customer with a security intelligence platform relates to identifying potential security vulnerabilities of customer software. The process of identifying software security vulnerabilities often involves testing and analysis. It is desirable for the security intelligence platform provider to perform an estimation operation to accurately estimate an effort and cost sizing of the identification process prior to actually performing the identification process.

This estimation is desirable to help estimate a required commitment of delivery resources, testing scope, contractual obligations, service levels as well as accurate price being committed to by a prospective customer. Often this estimation is performed using a subjective, often non-analytical estimative approach that may result in suboptimal resource utilization and commercial service financial performance. The less accurate the estimates, the less confidence a provider and customer have in the value provided, and the higher the resulting risk to the security intelligence platform provider. With increasing price pressures from competitors, it is desirable for a security intelligence platform provider to develop methods that allow the provider to accurately, repeatedly and reliably provide security vulnerabilities assessment estimations.

SUMMARY OF THE INVENTION

A method, system and computer-usable medium for generating a security analysis effort, cost and process scope estimates, comprising: analyzing a software system; identifying a complexity level of a security analysis, the complexity level of the security analysis comprising identification of an effort level for the security analysis; and, generating the security analysis effort estimate, the security analysis effort estimate comprising an estimate of an effort expenditure to perform a security analysis on the software system at the identified complexity level.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
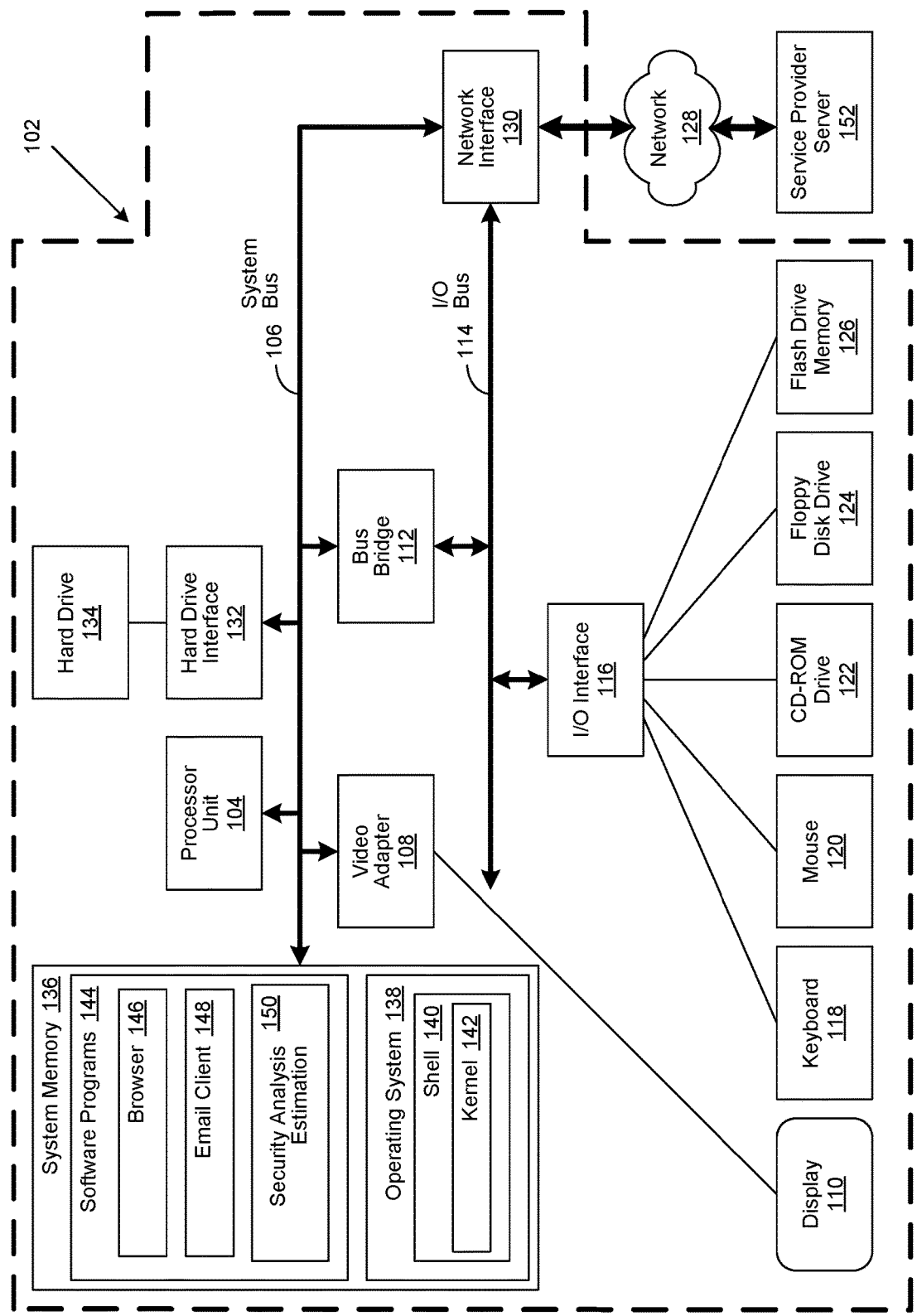
FIG. 1 depicts an exemplary client computer in which the present invention may be implemented.

A method, system and computer-usable medium are disclosed for performing a security analysis estimation operation for a software security vulnerabilities identification operation. More specifically, in certain embodiments, the security analysis estimation operation for a software security vulnerabilities identification operation provides a quantitative analytics driven determination of effort, assessment scope, depth, complexity and pricing. In certain embodiments, the quantitative machine learning based analytics driven determination includes an estimation of parameters and correlation of coefficients which can drive price and cost factors for the software security vulnerabilities identification operation.

In various embodiments, the security analysis estimation operation involves utilizing modified versions of dynamic and static analysis tools to perform a pre-assessment (i.e., a survey) of a target software system. Compiler design principals are employed by the security intelligence platform to collect data from various sources within the target software system (which can include one or more software applications). In various embodiments, the sources include one or more of source code artifacts, build system configuration, run-time application interface crawling and more. This data is collected during and after generating an intermediate code (ICode) representation of the software system. The ICode representation is a machine independent, language independent representation of the target software system and allows analysis of the target software system from a run-time perspective without the need to generate a machine specific binary executable. This representation is useful for many reasons, but with the security analysis estimation operation, the ICode representation addresses a disclosure issue. When a customer or their suppliers and 3rd parties do not wish to fully disclose or submit source code to the security intelligence platform provider for any reason (e.g. before a final price can be agreed and a services contract can be signed), the ICode representation enables a security analysis estimation operation to be performed without the need to fully disclose source code and other language specific artifacts to perform classical semantic based analysis and metrics gathering on the source code which may or may not be available for a specific survey.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural or functional programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. In various embodiments, software programs 144 may also include a security analysis estimation module 150. In these and other embodiments, the security analysis estimation module 150 includes code for implementing the processes described hereinbelow. In one embodiment, client computer 102 is able to download the security analysis estimation module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
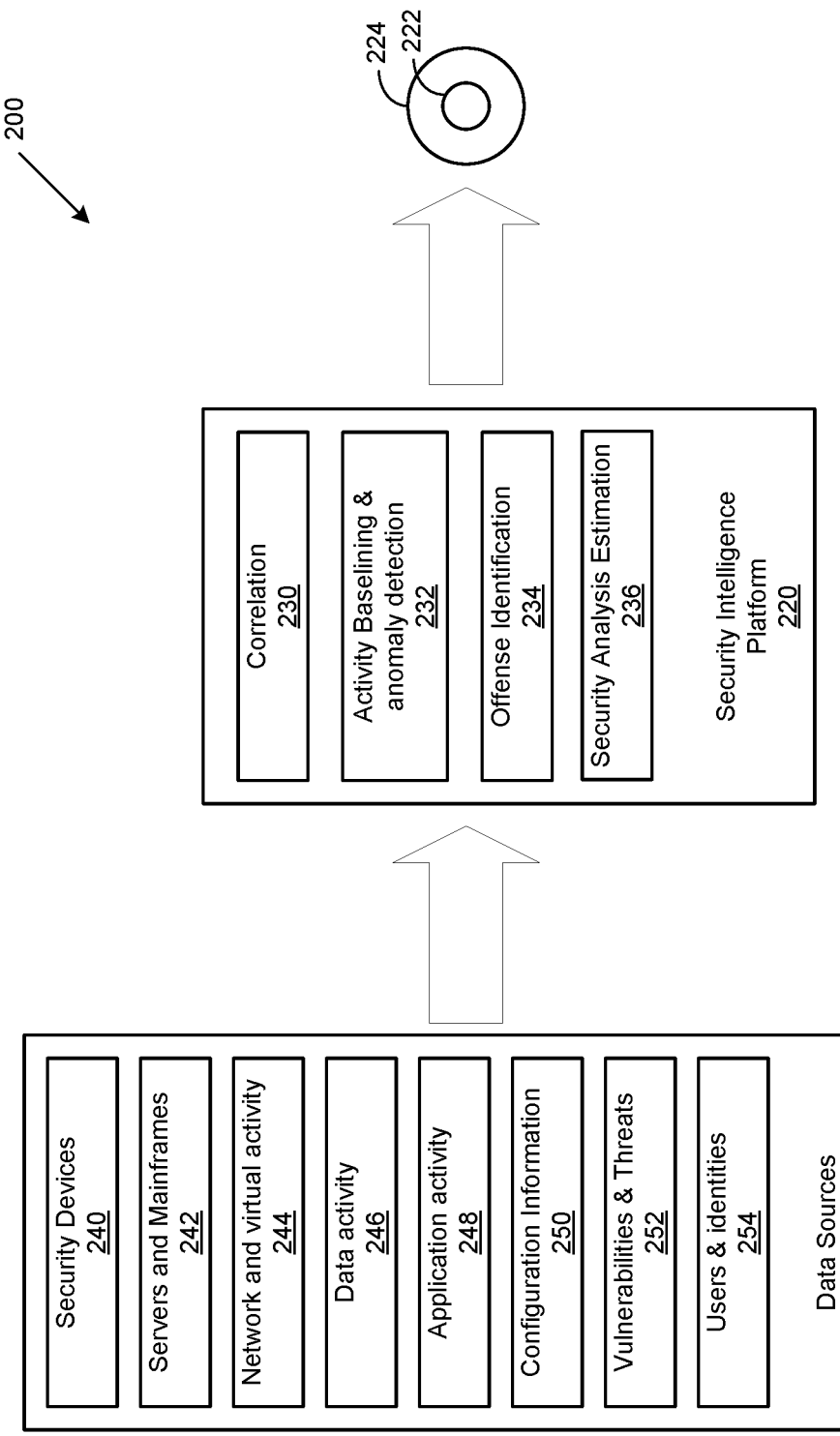
FIG. 2 is a block diagram of a security intelligence platform.

FIG. 2 shows a simplified block diagram of a security intelligence environment 200 which includes a security intelligence platform 210 in accordance with various aspects of the invention. The security intelligence platform 210 integrates security information and event management (SIEM), log management, anomaly detection, data analytics, vulnerability management, risk management and incident forensics into a unified solution. By using intelligence, integration and automation to provide 360-degree security insight, the security intelligence platform 210 delivers threat detection, ease of use and lower total cost of ownership. The security intelligence platform 210 uses intelligence, integration and automation to deliver security and compliance functionality.

The security intelligence platform 210 receives information from one or more of a plurality of data sources 220 and performs one or more of correlation operations, activity baselining and anomaly detection operations and offense identification operations to provide an identification of a true offense 222 as well as identification of suspected intendents 224. The security intelligence platform 210 can also perform a security estimation operation. In certain embodiments, the security intelligence platform 210 includes one or more of an integrated family of modules that can help detect threats that otherwise would be missed. For example, in certain embodiments, the family of modules can include a correlation module 230 for performing the correlation operations, an activity baselining and anomaly detection module 232 for performing the activity baselining and anomaly detection operations, an offence identification module 234 for performing the offence identification operation and a security analysis estimation module 236 for performing a security analysis estimation operation. In various embodiments, the correlation operation includes one or more of logs/events analysis, flow analysis, IP reputation analysis and geographic location analysis. In various embodiments, the activity baselining and anomaly detection operation includes one or more of user activity analysis, database activity analysis, application activity analysis and network activity analysis. In various embodiments, the offense identification operation includes one or more of credibility analysis, severity analysis and relevance analysis. The plurality of data sources 220 can include one or more of security devices 240, servers and mainframes 242, network and virtual activity data sources 244, data activity data sources 246, application activity data sources 248, configuration information data sources 250, vulnerabilities and threats information data sources 252 as well as users and identities data sources 254.

The security intelligence platform 210 helps detect and defend against threats by applying sophisticated analytics to the data received from the plurality of data sources. In doing so, the security intelligence platform 210 helps identify high-priority incidents that might otherwise get lost in the noise of the operation of a large scale information processing environment. The security intelligence platform 200 uses some or all of the integrated family of modules to solve a number of business issues including: consolidating data silos into one integrated solution; identifying insider theft and fraud; managing vulnerabilities, configurations, compliance and risks; conducting forensic investigations of incidents and offenses; and, addressing regulatory mandates.

In various embodiments, the security intelligence platform 210 provides a plurality of functions. For example, in certain embodiments, the security intelligence platforms consolidates data silos from a plurality of data sources. More specifically, while a wealth of information exists within organizations operating large scale information processing systems such as log, network flow and business process data, this information is often held in discrete data silos. The security intelligence platform 210 converges network, security and operations views into a unified and flexible solution. The security intelligence platform breaks down the walls between silos by correlating logs with network flows and a multitude of other data, presenting virtually all relevant information on a single screen. Such a correlation helps enable superior threat detection and a much richer view of enterprise activity.

Additionally, in various embodiments, the security intelligence platform performs an insider fraud detection operation. Some of the gravest threats to an organization can come from the inside the organization, yet organizations often lack the intelligence needed to detect malicious insiders or outside parties that have compromised user accounts. By combining user and application monitoring with application-layer network visibility, organizations can better detect meaningful deviations from normal activity, helping to stop an attack before it completes.

Additionally, in various embodiments, the security intelligence platform 210 predicts and remediates risk and vulnerabilities. Security, network and infrastructure teams strive to manage risk by identifying vulnerabilities and prioritizing remediation before a breach occurs. The security intelligence platform 210 integrates risk, configuration and vulnerability management with SIEM capabilities, including correlation and network flow analytics, to help provide better insight into critical vulnerabilities. As a result, organizations can remediate risks more effectively and efficiently.

Additionally, in various embodiments, the security intelligence platform 210 can conduct forensics analysis. In certain embodiments, the security intelligence platform 210 includes integrated incident forensics helps IT security teams reduce the time spent investigating security incidents, and eliminates the need for specialized training. The security intelligence platform 210 expands security data searches to include full packet captures and digitally stored text, voice, and image documents. The security intelligence platform helps present clarity around what happened when, who was involved, and what data was accessed or transferred in a security incident. As a result, the security intelligence platform 210 helps remediate a network breach and can help prevent it from succeeding again.

Additionally, in various embodiments, the security intelligence platform 210 addresses regulatory compliance mandates. Many organizations wrestle with passing compliance audits while having to perform data collection, monitoring and reporting with increasingly limited resources. To automate and simplify compliance tasks, the security intelligence platform 210 provides collection, correlation and reporting on compliance-related activity, backed by numerous out-of-the-box report templates.

The security intelligence platform 210 leverages easier-to-use security analytics. More specifically, the security intelligence platform 210 provides a unified architecture for storing, correlating, querying and reporting on log, flow, vulnerability, and malevolent user and asset data. The security intelligence platform 210 combines sophisticated analytics with out-of-the-box rules, reports and dashboards. While the platform is powerful and scalable for large corporations and major government agencies, the platform is also intuitive and flexible enough for small and midsize organizations. Users benefit from potentially faster time to value, lower cost of ownership, greater agility, and enhanced protection against security and compliance risks.

The security intelligence platform 210 provides advanced intelligence. More specifically, by analyzing more types of data and using more analytics techniques, the platform can often detect threats that might be missed by other solutions and help provide advanced network visibility.

The security intelligence platform 210 also provides advanced integration. Because the security intelligence platform includes a common application platform, database and user interface, the platform delivers massive log management scale without compromising the real-time intelligence of SIEM and network behavior analytics. It provides a common solution for all searching, correlation, anomaly detection and reporting functions. A single, intuitive user interface provides seamless access to all log management, flow analysis, incident management, configuration management, risk and vulnerability management, incident forensics, dashboard and reporting functions.

The security intelligence platform 210 also provides advanced automation. More specifically, the security intelligence platform 201 is simple to deploy and manage, offering extensive out-of-the-box integration modules and security intelligence content. By automating many asset discovery, data normalization and tuning functions, while providing out-of-the-box rules and reports, the security intelligence platform 210 is designed to reduce complexity of the operation of the platform.

Figure 3:
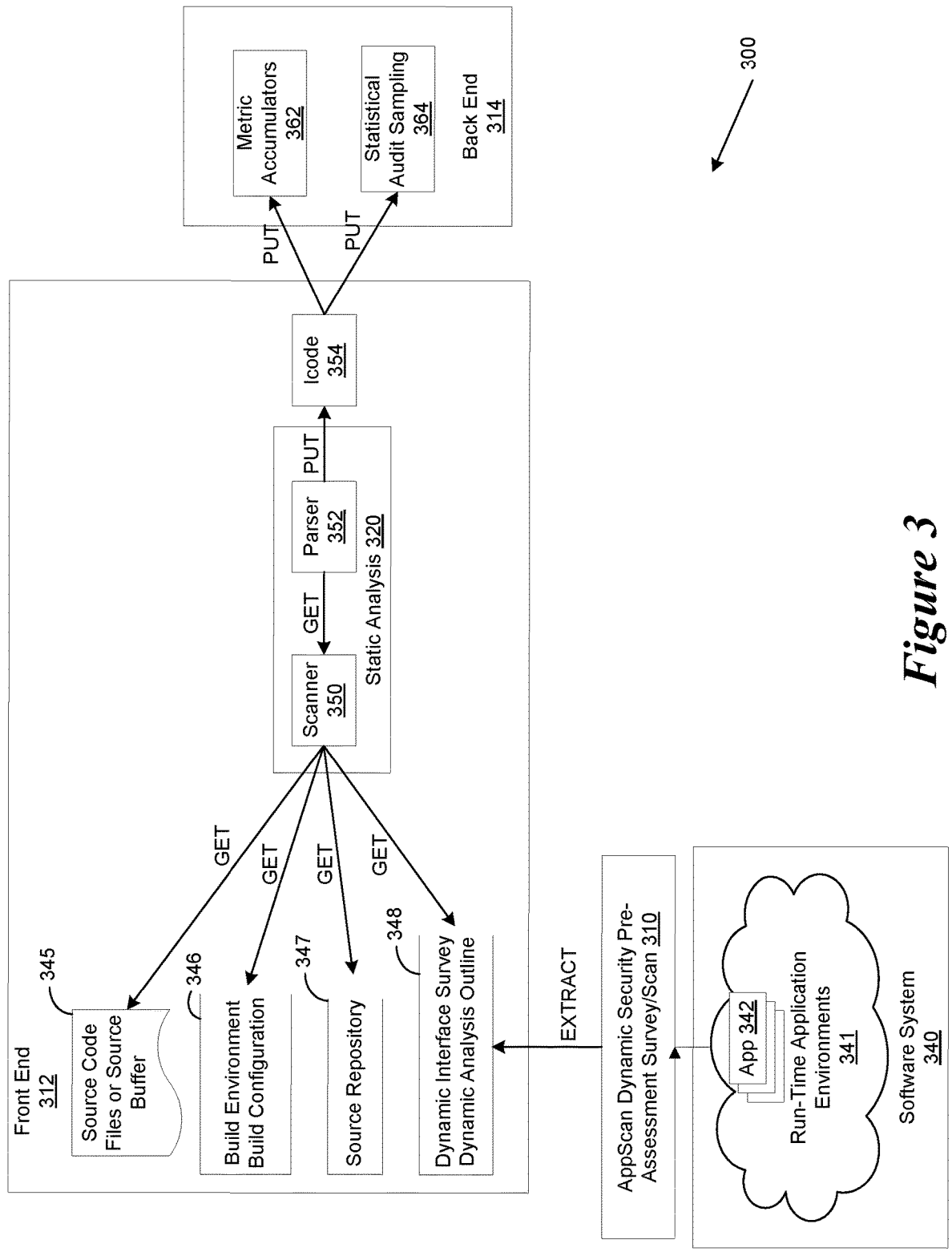
FIG. 3 is a block diagram of a security analysis estimation system.

Referring to FIG. 3, a block diagram of a security analysis estimation system 300 is shown. The security analysis estimation system 300 includes one or more of a plurality of subsystems. More specifically, in various embodiments, the security analysis estimation system 300 includes a dynamic (run-time analyzer) analysis scanning subsystem 310, a security analysis estimation front end 312 and a security analysis estimation back end 314 as well as a static analysis (source code analyzer) tool subsystem 320, which in certain embodiments is included within the security analysis front end 312.

The security analysis estimation front end 312 provides an input portion for the security analysis estimation operation as well as a compiler. The security analysis estimation front end 312 is provided as a tool to the customer and is run to gather the required data.

Data is collected by the security analysis front end 312 and is then made available for the security analysis estimation back end 314. In various embodiments, the security analysis estimation back end 314 is hosted by the security intelligence platform provider. In certain embodiments, the security analysis estimation back end 314 is provided as a service and includes pricing tables, sizing coefficients, etc. The security analysis estimation back end 314 governs the correlation between the data, and tables and coefficients when performing the security analysis estimation operation.

In certain embodiments, the dynamic analysis scanning subsystem 310 comprises a modified dynamic analysis scanning (modified AppScan Dynamic Analysis (DAST)) system. More specifically, the DAST system is modified to convert the test findings into an expression of the software system's run-time attack surface. I.e. the interfaces, I/O etc. that require analysis to determine vulnerabilities from an attacker perspective. While unmodified DAST systems seek to locate and find vulnerabilities in as many application "pages" as they can. The modified DAST system is not actually focused on finding vulnerabilities, but rather on identifying applications and capturing characteristics (such as size, technology in use, etc.) that can be used by the disclosed system. The dynamic analysis scanning subsystem performs an analysis of a target software system 340 especially the interfaces of the target software system 340. In certain embodiments, the target software system 340 includes the run time application environments 341 of a plurality of software applications 342. The data relating to the interfaces of the target software system 340 are used by the security analysis system 300 to perform a complexity assessment and pricing sub-system in regards to scope, breadth and depth complexity of a run-time collection of applications and systems of the target software system.

In various embodiments, the data that the dynamic analysis scanning subsystem 310 extracts from the target software system 340 includes one or more of source code files and/or source buffer information 345, build environment information and/or build configuration information 346, a source repository 347 and a dynamic interface survey and/or a dynamic analysis outline 348.

In certain embodiments, the static analysis tool subsystem 320 includes scanner 350 as well as a parser 352. In certain embodiments, the scanner comprises a modified static analysis tool (Source Static Analysis (SAST)). The modified SAST system to not actually attempt to identify all vulnerabilities within the customer system. Instead during the estimation phase the modified SAST tool performs the parsing and generation of the ICode The SAST functions similarly to compilers. To scan an application the SAST proceeds in phases which includes an ingest/parse phase, a transform phase and an analyze phase during which the tool analyzes the ICode. The SAST include analysis algorithms that are language agnostic. In this way the same security algorithm can be used to find security issues in Java and C++ code. The SAST parser has insight into all kinds of data that is important to the estimation operation. For example the SAST parser can determine a type of code being analyzed, how large the code is, how many files are being analyzed, dependencies the code has, does the code look like a web app, etc. The static analysis tool subsystem 320 compiles source code into an intermediate code (ICode) representation state 354. With the intermediate code representation state aspects of the original software system such as number of instructions, execution paths, external component or library dependencies and more may be accurately determined. These aspects can then be applied to perform a quantitative determination of complexity and pricing.

One advantage in modifying existing implementations is that the existing implementations provide a solid foundation from a functionality point of view for the front end and data collection aspects of the security analysis estimation operation. For example, the dynamic analysis scanning system AppScan is a leading security assessment tool that can be modified to gather the appropriate data to perform the security analysis estimation operation. Many existing systems (e.g., AppScan) typically already have "plugins" into environments that contain additional data useful for estimation. For example a modified AppScan plugin for build environments such as the Ant, Maven, Make build environments or automation environments such as the Jenkins, and UrbanCode automation environments could provide insight into the number of applications under active development and being built/deployed regularly The security analysis estimation back end 314 performs operations relating to one or more aspects of measurements and metrics that can be collected during the compilation of the program and other input data sources and generation of the ICode representation. The security analysis estimation back end 314 includes a metric accumulator module 360 and a statistical audit sampling module 362.

The metric accumulator module 360 performs one or more of a plurality of measurements including determining a number of object or data structure declarations, number of unique method signatures, number of unique execution paths, none looped logical execution branches, a number of loops, a number of recursive call structures, a number of statically linked libraries and a number of dynamically linked libraries. The statistical audit sampling module 362 generates one or more of a plurality of metrics which are useful for complexity characterization. More specifically, the plurality of metrics include an average instructions per unique method, an average loops per method, an average logical condition nested depth, a cyclomatic complexity metric (e.g., via a McCabe Analysis), and an identification of coefficients.

Another important aspect of the security analysis estimation operation includes continuous improvement and refinement of estimation factors and coefficients based on real-world measurements of security assessment performance. This data becomes important to feed back in to the machine learning security analysis estimation system 300 to produce meaningful correlation between past machine generated estimates and actual measured contract/services performance and experience in the field.

Machine learning methods such as linear regression are used to help refine coefficients used in estimations and derive new estimation functions that improve prediction based on measured complexity.

In certain embodiments, a supervised learning algorithm is used within a pricer operation of the security analysis estimation operation.

More specifically, the supervised machine learning algorithm begins by defining a training set of size m comprising n software complexity features (specified as $x_j^i$) and corresponding software security analysis price, the output or target (denoted by $y^i$). The training set may be depicted as the following table:

| Lines of Code | Cyclomatic Complexity | Class Coupling | Maintain- ability Index | . . . | Crypto- API Calls | Security Assessment Price |
|---|---|---|---|---|---|---|
| 0.342 | 0.1123 | 0.005 | 0.1 | . . . | 0.03 | $243,203.22 |
| . . . | . . . | . . . | . . . | . . . | . . . | . . . |
| $x_1^m$ | $x_2^m$ | $x_3^m$ | $x_4^m$ | . . . | $x_n^m$ | $y^m$ |

The choice of which software complexity features are inclusive to the training set and the target price are dependent on the implementation of the specific machine learning algorithm. The disclosed machine learning algorithm concentrates on deriving a correlation between an arbitrary number (n) of complexity features in the training set and how the training set is used to predict price estimates.

Feature set values are scaled or normalized such that values of all the features fall within the range of −1 to +1. In other words:

$$\forall\ x_j^i, \text{ where } 1 \le i \le m, \text{ and } 1 \le j \le n, -1 \le x_j^i \le +1$$

Feature value scaling is used to optimize LMS (least mean square) algorithm performance run-time.

One fundamental hypothesis of the supervised machine learning algorithm is that the relationship between any given software complexity feature and price output is principally linear. For every incremental increase in value of any given software complexity feature, there is a corresponding linear increase in price. One task of the learning algorithm is to help define a specific parameterized multivariate linear regression model.

More specifically, the pricer model is denoted as a parameterized h( ) function:

$$h_\theta(x) = \theta_0 + \theta_1 x_1 + \theta_2 x_2 + \theta_3 x_3 + \theta_4 x_4 + \ldots + \theta_n x_n$$

where θ denotes the parameters or weights of the linear function mapping from the software complexity feature metrics space to Y, which is the price space that we are interested in estimating.

To simplify notation, h(x) is expressed as follows:

$$h(x) = \Sigma_{i=0}^n \theta_i x_i = \theta^T x$$

The short hand above $\theta^T x$ transposes the matrix of the parameter vector of h(x) times the column vector x.

For the purpose of initial description, Ordinary Least squares algorithm is employed where the cost function J( ) is defined as follows:

$$J(\theta) = \tfrac{1}{2} \Sigma_{i=0}^m (h_\theta(x^{(i)}) - y^{(i)})^2$$

One goal of the operation is to minimize the cost function J( ) cross all software complexity metrics features. Therefore, the parameter vector θ is computed so as to minimize the function using a computationally efficient approach by employing simplistic gradient descent algorithm which starts with an initial vector θ and a learning rate coefficient α, and repeatedly performs the following iterative update $$\theta_j := \theta_j - \alpha \frac{\partial}{\partial \theta_j} J(\theta)$$

Since the partial derivative of J( ) with respect to any parameter in the training set can be expressed as:

$$\frac{\partial}{\partial \theta_j} J(\theta) = (h_\theta(x) - y)x_j$$

The least mean squares algorithm can be expressed as follows:

Repeat until convergence $\{\theta_j := \theta_j + \alpha \Sigma_{i=0}^m (y_j^{(i)} - h_\theta(x_j^{(i)}))x_j^{(i)}, \forall j, 1 \le j \le n\}$ Convergence is defined as when the derivative or gradient is computed to be 0.

In certain embodiments, a grey box approach (i.e., a combination of white box type analysis and black box type analysis) is used to run an executable within a sandbox (i.e., an isolated analysis environment). This grey box approach can be used to measure and determine instructions count, execution paths and more without directly accessing source code or the ICode representation. This grey box approach is more analogous to reverse engineering and decomposition of a fully complied and linked executable program.

Although the present invention has been described in detail, it should be understood that various changes, substitutions and alterations can be made hereto without departing from the spirit and scope of the invention as defined by the appended claims.

What is claimed is:

1. A computer-implemented method for generating a security analysis effort, cost and process scope estimates within a security intelligence environment, the security intelligence environment comprising a plurality of data sources and a security intelligence platform, the security intelligence platform comprising a security analysis estimation module, the security analysis estimation module executing on a hardware processor of a computer system, comprising:
    analyzing a software system via the security analysis estimation module of the security intelligence platform, the analyzing the software system utilizing information received from at least one of the plurality of data sources;
    identifying a complexity level of a security analysis via the security analysis estimation module of the security intelligence platform, the complexity level of the security analysis comprising identification of an effort level for the security analysis; and,
    generating the security analysis effort estimate via the security analysis estimation module of the security intelligence platform, the security analysis effort estimate comprising an estimate of an effort expenditure to perform a security analysis on the software system at the identified complexity level, the security analysis estimation module providing a quantitative machine learning based analytics driven determination, the quantitative machine learning based analytics driven determination providing an estimation of parameters and correlation of coefficients which can drive price and cost factors for the software security vulnerabilities identification operation.

2. The method of claim 1, wherein:
the security analysis comprises a software security vulnerabilities identification operation.

3. The method of claim 1, wherein:
the quantitative machine learning based analytics driven determination provides at least one of effort, assessment scope, depth, complexity and pricing associated with the security analysis.

4. The method of claim 3, wherein:
the quantitative machine learning based analytics driven determination includes an estimation of parameters and correlation of coefficients which can drive price and cost factors for the software security vulnerabilities identification operation.

5. The method of claim 3, wherein:
the security analysis estimation operation comprises utilizing modified versions of dynamic and static analysis tools to perform a pre-assessment of the software system.

6. The method of claim 1, wherein:
the analyzing the software system comprises generating an intermediate code (ICode) representation of the software system, the ICode representation of the software system comprising a machine independent, language independent representation of the software system.

7. A system comprising:
a hardware processor;
a data bus coupled to the processor; and
a computer-usable medium embodying computer program code, the computer-usable medium being coupled to the data bus, the computer program code used for generating a security analysis effort, cost and process scope estimates within a security intelligence environment, the security intelligence environment comprising a plurality of data sources and a security intelligence platform, the security intelligence platform comprising a security analysis estimation module, the security analysis estimation module executing on a processor of a computer system and comprising instructions executable by the processor and configured for:
analyzing a software system, the analyzing the software system utilizing information received from at least one of the plurality of data sources;
identifying a complexity level of a security analysis, the complexity level of the security analysis comprising identification of an effort level for the security analysis, the complexity level of the security analysis comprising identification of an effort level for the security analysis, the identifying comprising performing a security analysis estimation operation; and,
generating the security analysis effort estimate, the security analysis effort estimate comprising an estimate of an effort expenditure to perform a security analysis on the software system at the identified complexity level, the security analysis estimation module providing a quantitative machine learning based analytics driven determination, the quantitative machine learning based analytics driven determination providing an estimation of parameters and correlation of coefficients which can drive price and cost factors for the software security vulnerabilities identification operation.

8. The system of claim 7, wherein:
the security analysis comprises a software security vulnerabilities identification operation.

9. The system of claim 7, wherein:
the quantitative machine learning based analytics driven determination provides at least one of effort, assessment scope, depth, complexity and pricing associated with the security analysis.

10. The system of claim 9, wherein:
the quantitative machine learning based analytics driven determination provides at least one of effort, assessment scope, depth, complexity and pricing associated with the security analysis.

11. The system of claim 9, wherein:
the security analysis estimation operation comprises utilizing modified versions of dynamic and static analysis tools to perform a pre-assessment of the software system.

12. The system of claim 7, wherein:
the analyzing the software system comprises generating an intermediate code (ICode) representation of the software system, the ICode representation of the software system comprising a machine independent, language independent representation of the software system.

13. A non-transitory, computer-readable storage medium embodying computer program code for generating a security analysis effort, cost and process scope estimates within a security intelligence environment, the security intelligence environment comprising a plurality of data sources and a security intelligence platform, the security intelligence platform comprising a security analysis estimation module, the security analysis estimation module executing on a hardware processor of a computer system, the computer program code comprising computer executable instructions configured for:
analyzing a software system, the analyzing the software system utilizing information received from at least one of the plurality of data sources;
identifying a complexity level of a security analysis, the complexity level of the security analysis comprising identification of an effort level for the security analysis, the complexity level of the security analysis comprising identification of an effort level for the security analysis; and,
generating the security analysis effort estimate, the security analysis effort estimate comprising an estimate of an effort expenditure to perform a security analysis on the software system at the identified complexity level, the security analysis estimation module providing a quantitative machine learning based analytics driven determination, the quantitative machine learning based analytics driven determination providing an estimation of parameters and correlation of coefficients which can drive price and cost factors for the software security vulnerabilities identification operation.

14. The non-transitory, computer-readable storage medium of claim 13, wherein:
the security analysis comprises a software security vulnerabilities identification operation.

15. The non-transitory, computer-readable storage medium of claim 13, wherein:
the quantitative machine learning based analytics driven determination provides at least one of effort, assessment scope, depth, complexity and pricing associated with the security analysis.

16. The non-transitory, computer-readable storage medium of claim 15, wherein:
the quantitative machine learning based analytics driven determination provides at least one of effort, assessment scope, depth, complexity and pricing associated with the security analysis.

17. The non-transitory, computer-readable storage medium of claim 15, wherein:
the security analysis estimation operation comprises utilizing modified versions of dynamic and static analysis tools to perform a pre-assessment of the software system.

18. The non-transitory, computer-readable storage medium of claim 13, wherein:
the analyzing the software system comprises generating an intermediate code (ICode) representation of the software system, the ICode representation of the software system comprising a machine independent, language independent representation of the software system.

19. The non-transitory, computer-readable storage medium of claim 13, wherein the computer executable instructions are deployable to a client system from a server system at a remote location.

20. The non-transitory, computer-readable storage medium of claim 3, wherein the computer executable instructions are provided by a service provider to a user on an on-demand basis.

* * * * *